United States Patent [19]

Eng

[11] Patent Number: 4,623,960

[45] Date of Patent: Nov. 18, 1986

[54] BIAS POWER SOURCE ENERGIZED BY TERTIARY WINDING INCLUDING HYSTERESIS CHARACTERISTIC FOR DISABLING THE POWER SWITCH WHEN A MINIMUM BASE DRIVE SIGNAL CAN NO LONGER BE MAINTAINED

[75] Inventor: Wing K. Eng, Stanhope, N.J.

[73] Assignee: AT&T Bell Laboratories, Murray Hill, N.J.

[21] Appl. No.: 661,137

[22] Filed: Oct. 15, 1984

[51] Int. Cl.[4] .................................. H02M 3/335
[52] U.S. Cl. .................................. 363/21; 363/56; 363/97
[58] Field of Search ............ 363/21, 56, 95, 97

[56] References Cited

U.S. PATENT DOCUMENTS 4,323,961  4/1982  Josephson ........................ 363/21
4,357,572  11/1982  Anderson et al. ................. 323/286

*Primary Examiner*—Patrick R. Salce
*Assistant Examiner*—Anita M. Ault
*Attorney, Agent, or Firm*—Alfred G. Steinmetz

[57] ABSTRACT

A converter circuit that derives its bias power from voltage supplied by a tertiary winding including a tertiary winding voltage level responsive circuit with a hysteretic characteristic to selectively enable and disable the drive circuitry controlling the converter's power switching transistor. Should the bias voltage drop due to an output fault, the converter is operated at a subfrequency of its normal operating frequency in order to prevent operating the power switching transistor in its active region during high current conduction.

12 Claims, 6 Drawing Figures

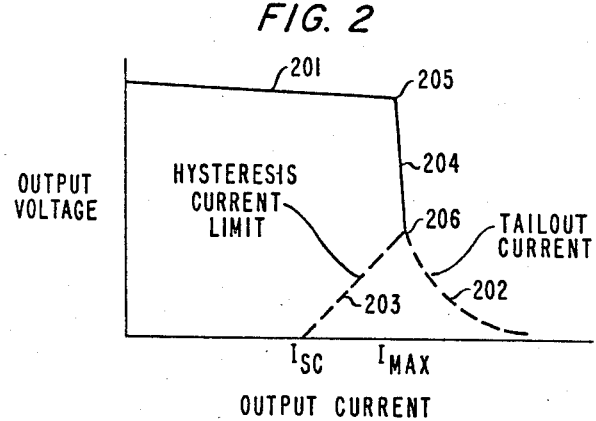
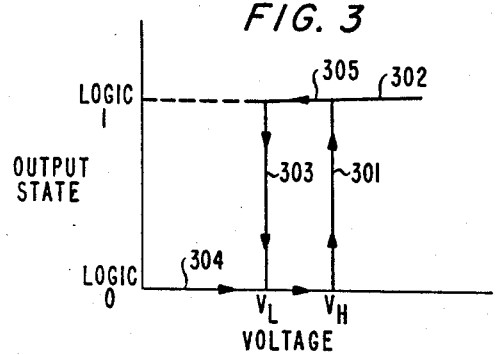

BIAS POWER SOURCE ENERGIZED BY TERTIARY WINDING INCLUDING HYSTERESIS CHARACTERISTIC FOR DISABLING THE POWER SWITCH WHEN A MINIMUM BASE DRIVE SIGNAL CAN NO LONGER BE MAINTAINED

FIELD OF THE INVENTION

This invention relates to switching converters where power for the primary control circuit is obtained from a tertiary winding of a power transformer of the converter. It is specifically concerned with a control arrangement that prevents operation of a power semiconductor switching device in its active region, if the tertiary winding voltage drops to a low level.

BACKGROUND OF THE INVENTION

The power for the primary side control circuits of a switching converter may be conveniently obtained from a tertiary winding of the power transformer. This power is used to energize primary control logic circuits and to provide base drive signals for the power semiconductor switching devices. Should the voltage on the tertiary winding drop, the base drive signals to the power switching devices could drop to a low level so that the switch is operated in its active region. In the case where the low voltage is caused by an output fault, the high currents induced in the power switching device, while it is in the active region, could cause it to fail.

BRIEF DESCRIPTION OF THE INVENTION

A converter circuit embodying the principles of the invention and deriving its bias power from a tertiary winding on the power transformer includes a voltage level responsive hysteresis control between the tertiary winding voltage source for bias voltages and the control logic and base drive circuitry for the power switch. At start-up, the base drive circuitry is enabled when an upper level bias voltage threshold is attained. Should the bias voltage supplied by the tertiary winding decrease to a lower level threshold below the upper level, the base drive circuitry is disabled and is not re-enabled until the upper level threshold is again attained.

BRIEF DESCRIPTION OF THE DRAWINGS

An appreciation of the invention may be readily attained by reference to the following specification and the accompanying drawings in which:

FIG. 2 is a grap showing the output voltage-current regulation characteristic of a conventional converter and a converter embodying the principles of the invention;

FIG. 3 is a graph of the transfer hysteresis characteristic of a hysteresis controller responsive to the bias voltage output of a tertiary winding;

DETAILED DESCRIPTION

Figure 1:
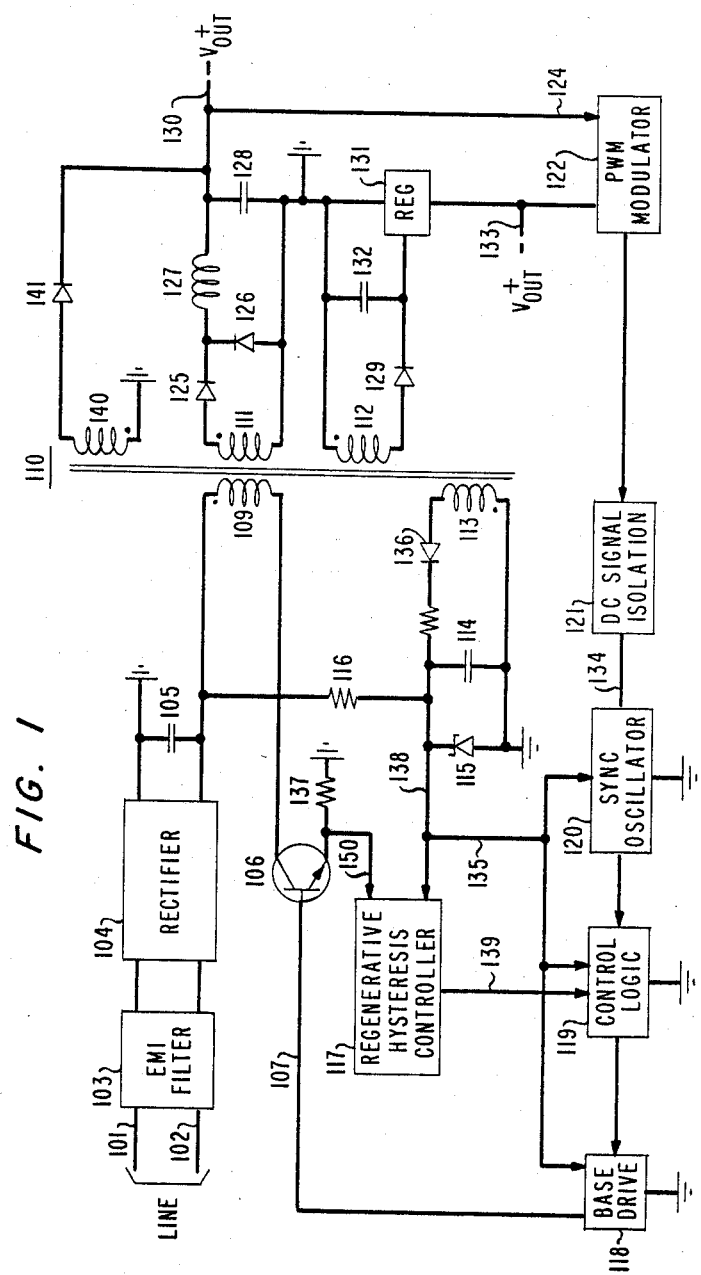
FIG. 1 is a combination schematic and block diagram of a switching converter circuit embodying the principles of the invention.

A power converter embodying the principles of the invention is shown in FIG. 1. Input AC power is coupled to input terminals 101 and 102 and may be an AC signal derived from a commercial AC power line. This power signal is coupled through an EMI filter 103 to a rectifier circuit 104, which provides a DC voltage on storage capacitor 105. The EMI filter 103 is included to block the transmission of transients due to the switching action of the converter back into the power line.

The DC voltage of the capacitor 105 is coupled to the primary winding 109 of the power transformer 110. This winding is coupled, in turn, by the power switching transistor 106 and a shunt resistor 137 to ground.

The power transformer 110 as shown, includes a primary winding 109, two output secondary windings 111 and 112, a reset winding 140 and a tertiary winding 113. While two secondary windings are shown, it is to be understood that the circuit may have only one secondary winding or it may have multiple windings in excess of two in converter circuits embodying the invention. The secondary winding 111 is coupled via a diode 125 to a storage inductor 127. The switching action of diode 125 and the accompanying flyback diode 126 form a buck-type regulating circuit and supplies a DC voltage on the capacitor 128 which appears at output terminal 130 as a positive DC voltage. The secondary winding 112 is coupled through a rectifying diode 129 and a storage capacitor 132, to an integrated voltage regulator circuit 131 which supplies a positive voltage at output terminal 133 to power the pulse width modulator 122. The reset winding 140 is coupled through a rectifying diode 141 to the positive DC voltage terminal 130.

The voltage of output terminal 130 is sensed via lead 124 and the sensed voltage is applied to a pulse width control modulating circuit 122, which compares the sensed output voltage with a reference voltage and generates a pulse width control signal, which is coupled via a signal isolation circuit 121 and lead 134 to control circuitry on the primary side of the converter. The isolation circuit may comprise an optoisolator, a pulse transformer or any suitable equivalent that isolates DC electrical ground.

The control circuitry receiving the pulse width control signal includes a synchronized oscillator circuit 120 which responds to the control signals generated by the pulse width modulator 122. A control logic circuit 119 utilizes the timed output signals of the oscillator 120, to supply control signals to a base drive circuit 118, so that base drive signals applied to the base 107 of transistor 106 causes it to conduct with controlled intervals to achieve the desired regulated output voltage at terminal 130. The peak current in the power switch 106 is also monitored by sensing a voltage across shunt resistor 137. This voltage is coupled via lead 150 to the regenerative hysteresis controller 117 which includes peak current control circuitry. Peak current control is a regulation technique which has been disclosed by C. W. Deisch in an article entitled "Simple Switching Control Method Changes Power Converter Into A Current Source" and published in the 1978 PESC Conference Record. Since peak current control is known to those skilled in the converter art, no detailed disclosure of the circuitry to accomplish it is deemed necessary.

Rather than using a separate power source to energize the control circuitry on the primary side, power is derived from a tertiary winding 113 of the power transformer. This tertiary winding 113 is connected via a rectifier diode 136 to a voltage storage capacitor 114. Breakdown diode 115 limits the maximum voltage permitted on capacitor 114. This capacitor 114 is also coupled via resistor 116 to receive voltage from the input voltage storage capacitor 105. This capacitor arrangement allows energy to be accumulated and supplied to the control circuitry during start-up.

The voltage on capacitor 114, is coupled via lead 135 to the synchronized oscillator circuit 120, the control logic circuit 119 and the base drive circuit 118 in order to energize them. Initially at start-up, the capacitor 105 is rapidly charged up to a stable voltage which may represent the RMS voltage at the input AC signal through rectifier 104. This voltage is applied via resistor 116 to capacitor 114 and the voltage thereon enables the operation of the base drive, control logic and synchronized oscillator circuits which, in turn, initiates switching action in the transistor 106. The output voltage builds up to some desired level and when the output voltage level desired is approximately reached, the voltage generated across the tertiary winding 113 is sufficient to keep the capacitor 114 charged to a steady state voltage which enables the control circuits to be properly energized. Should an output fault cause an excessive overload or a short circuit, however, the output and control circuitry in order to maintain the output attempts to supply additional current to the output terminal to regulate the voltage to the desired level.

The control logic circuit 119 responds to the regenerative hysteresis controller 117 via lead 139 which limits the maximum permissible output current by shortening of the conduction time. The instantaneous current level through power switching transistor 106 is sensed by the regenerative hysteresis controller 117 via lead 150 which is coupled to sense the voltage across shunt resistor 137 connected in series with the power switching transistor 106. The control logic circuit becomes operative in the current limit mode in response to an output fault to limit the power converter output current by shortening of the conduction time. Since the current is limited, the output voltage continues to drop causing a corresponding decrease in voltage across the tertiary winding 113 through coupling of the reset winding 140. With the energizing voltage applied to the control logic and base drive circuit, decreasing in value, a point is eventually reached where the base drive signals supplied to the power switching transistor 106 by the base drive circuit 118 are no longer able to drive the power switching transistor 106 into its saturated region during an over current or output fault condition. Hence, the power switching transistor 106 must sustain or accommodate the current flowing through it at the maximum current limit while operating in its active region which causes significant power dissipation within the transistor. A power switching transistor having adequate ratings to safely operate during normal operating conditions, may go into a failure mode if forced to operate in the active region. This means that a transistor of higher power rating than normally needed must be specified to prevent failure under these fault conditions. This adds considerably to the cost of the switching converter.

A regenerative hysteresis controller 117 is included in the switching converter to sense the voltage supplied by the tertiary winding 113 at lead 138 and under low voltage conditions supply a disabling signal, via lead 139, to the control logic circuit 119 to prevent operation of the power switching transistor 106 in its active operation region at high current limit levels. The regenerative hysteresis controller supplies an enabling signal to the control logic circuit 119, when the voltage supplied by the bias winding 113 achieves an upper threshold value. Should the voltage decline in value to a lower threshold below the upper threshold value, the regenerative hysteresis controller 117 responds to a lower threshold value achieved on the down going side to apply a disabling signal via lead 139 to the control logic circuit 119.

The regulation output characteristic of the converter is shown in FIG. 2, wherein output line 201 represents the voltage regulation characteristic up to the corner node 205. Normally, the converter operates in a voltage regulation mode, as shown by regulation line 201, with varying currents as demanded by the load. Should the current reach the current limit value at node 205, the converter switches into a current limit mode of operation. The current regulation characteristic 204 is followed down to current node 206 as the output voltage drops. At this point, the output current with a conventional peak current limit control tends to tail-out along the dotted characteristic curve 202 to some value greater than the regulated or limit value, due to the fact, that the peak current sensing error at low duty cycles of the power switch tends to become inaccurate and allows the output current to increase by a significant value. The effect of the hysteresis controller on the current limit characteristic is shown by the other dotted characteristic curve 203 which represents the current limit characteristic when the regenerative hysteresis controller 117 is used for periodically enabling and disabling the control logic circuit. It is readily apparent from inspection of FIG. 2, that with the hysteresis control, the short circuit or output fault current decreases in magnitude as the output voltage drops.

The output states provided by the regenerative hysteresis controller on lead 139, in response to the voltage magnitude on capacitor 114, is readily apparent by inspection of FIG. 3. At turn-on, the output state of the hysteresis circuit is initially at logic 0 state when the voltage on capacitor 114 is very low. The voltage on capacitor 114, supplied by the rectified line voltage on capacitor 105 through resistor 116, will gradually increase along the base line 304 representing voltage magnitude until the high voltage threshold shown by line 301 is reached. At this point, the output of the hysteresis controller jumps to a logic 1, output as shown by level 302, and remains at that point until the voltage drops to level 303. Should the voltage on capacitor 114 decrease in value after the hysteresis controller output is at the logic 1 state, the characteristic followed is along line 305 until the characteristic line 303 representing the low voltage threshold is reached at which point the output of the hysteresis controller drops back to a logic 0 value.

Figure 4:
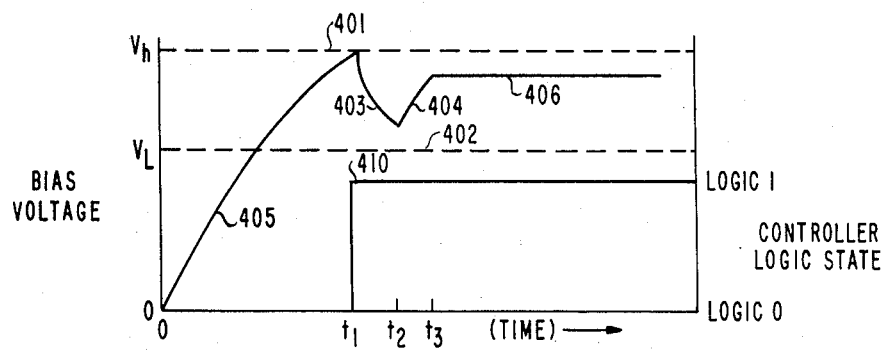
FIG. 4 graphically shows the start-up response of the bias voltage.

The waveforms in FIG. 4 illustrate how the hysteresis controller operates during start-up of the converter switching circuit. From the starting point designated 0 to the first timing mark, $t_1$, the initial bias voltage on capacitor 114 is increasing along charging curve 405 and is allowed to charge up to the upper threshold level 401 designated $V_h$. Once this initial starting upper threshold voltage value $V_h$ at level 401 has been reached at $t_1$ the regenerative controller is switched so that it assumes a logic 1 state, as shown by curve 410. This output state enables the control logic so that the base drive circuit is activated. Once the base drive circuit is activated, its energy requirements cause the capacitor 114 to briefly discharge along discharge curve 403, but it does not dip down to the lower threshold level $V_l$ at line 402 and after a short discharge interval to time $t_2$ the voltage of capacitor 114 recharges from the tertiary winding 113 along charge curve 404 up to a final steady-state voltage value along line 406 which has sufficient voltage to sustain adequate base drive power to drive the power switching transistor. This state continues indefinitely until a fault occurs or the converter is de-energized.

Figure 5:
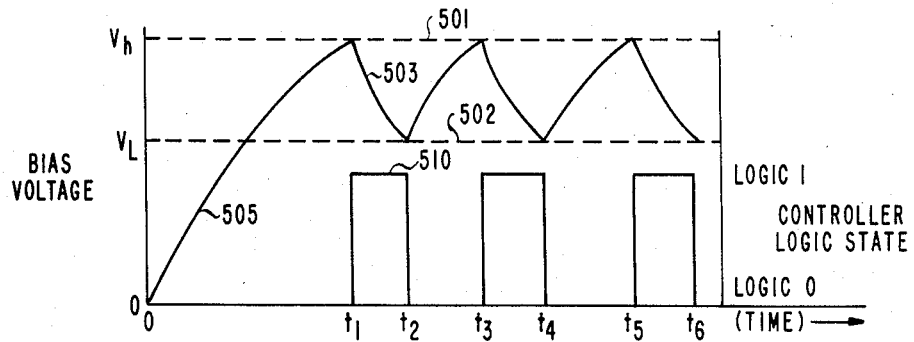
FIG. 5 graphically shows the response of the bias voltage in response to an output fault.

The waveforms of FIG. 5 illustrate a starting response when the output of the converter is shorted by a fault thereby causing the converter to operate in a current limiting condition. As described above, the initial charge up of the bias voltage capacitor 114 proceeds along charge curve 505 to the upper threshold level $V_h$ of line 501 at $t_1$, whereupon, the output of the regenerative hysteresis controller switches to a logic one state. Because of the output current fault and the inability of the tertiary winding to maintain the voltage on capacitor 114, the capacitor 114 discharges along curve 503 to the lower voltage threshold $V_L$ at line 502. The output of the regenerative hysteresis controller at time $t_1$ switches into logic 1 state at level 510 as soon as the upper voltage threshold 501 is reached at time $t_1$, it switches back to its 0 state output at time $t_2$ when the voltage along discharge curve 503 reaches the lower threshold $V_L$. As is apparent from FIG. 5, the voltage of the capacitor 114 charges and discharges periodically from the upper voltage threshold to the lower voltage threshold with accompanying switching of the logic state output of the regenerative hysteresis controller. Because of this switching of the logic output state of the regenerative hysteresis controller, the control logic and the base drive circuits 118 and 119 are periodically energized or pulsed on and off at a subfrequency with respect to the normal operating frequency of the switching converter. This pulse type energization is continued until the output fault or short circuit is removed. The output current in this mode of operation is limited, as shown in FIG. 2, to the output current shown by the intersection of line 203 with the abscissa of FIG. 2, and this value is designated as the subfrequency duty ratio current limit value.

Figure 6:
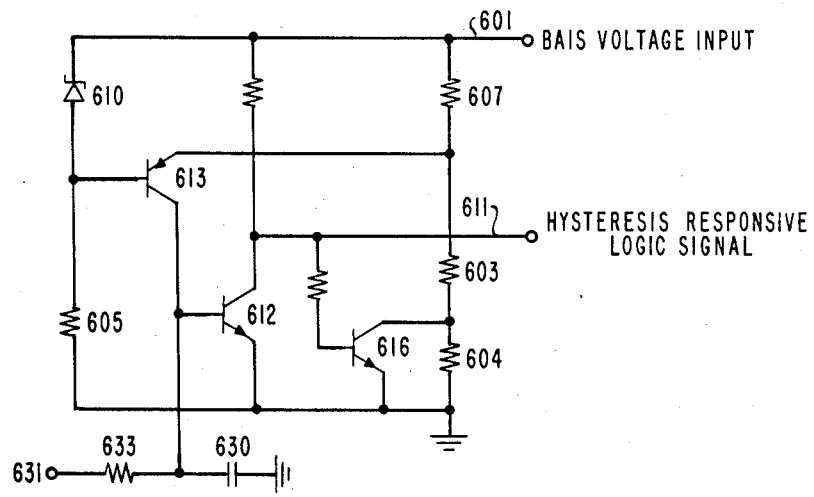
FIG. 6 is a schematic of an illustrative regenerative control circuit embodying the principles of the invention.

A schematic of one suitable embodiment or realization of the regenerative hysteresis controller is shown in FIG. 6. The bias voltage generated by the tertiary winding 113 is applied to an input or sensing terminal 601 of the hysteresis control circuit. This voltage will appear across a series connection of a breakdown or zener type diode 610 and a resistor 605. At the initial turn-on conditions, the voltage will be increasing at the charging rate of the RC circuit including the resistor 116 and capacitor 114 as shown in FIG. 1. This rate is shown by the initial charging waveform shown in FIGS. 4 and 5. As long as the voltage applied to terminal 601 is less than the breakdown voltage of breakdown diode 610, the transistors 613 and 612 are biased in a conducting condition and the transistor 616 is biased in a nonconducting condition. In the particular circuit state, the output of the output lead 611 is at logic 0, which signal state is operative to disable the base drive and the control logic circuits 118 and 119, thereby, preventing drive signals from being applied to the power switching transistor. When the bias voltage at lead 601 has increased to a sufficient level, to the zener or breakdown diode 610 breakdown and conducts.

A reference voltage set by diode 610's breakdown voltage in combination with a voltage across resistor 607 determines at what voltage level applied to lead 601 the transistor 613 switches from an on to off condition. The exact voltage across resistor 607 is determined by the voltage on lead 601 and the relative impedance of series connected resistors 607, 603 and 604 which divide the the voltage level at lead 601. The voltage dividing is arranged so that at the high level threshold, the voltage across the breakdown diode 610 is equal to the base emitter junction voltage of the transistor 613 as summed with the voltage drop across resistor 607. When the upper or high level voltage threshold is reached, at start-up, the transistors 612 and 613 are biased into a nonconducting or off condition and the transistor 616 is biased into a conducting or on condition and the output on lead 611 switches to a logic state 1, thereby, enabling the control logic 119 and the base drive circuit 118. Since transistor 616 is now conducting resistor 604 is shorted out of the voltage dividing circuit, and hence, a larger proportion of the voltage at lead 601 is applied to keep the base to emitter junction of transistor 613 in a reverse biased condition. The base emitter junction of transistor 613 is back biased and it remains in this back biased cutoff condition until the low level threshold is reached and the voltage across the zener diode 610 equals the base emitter junction voltage of transistor 613, plus the voltage presently existing across the resistor 607. When the voltage has dropped to this level, the output of the regenerative hysteresis controller is switched back to a logic 0. It is apparent from the foregoing discussion that the width of the hysteresis window is determined by the value of the breakdown voltage of breakdown diode 610, the base emitter junction voltage of transistor 613, the resistance ratio of the resistors 603, 604 and 607.

Peak current control may be implemented with the regenerative hysteresis controller by coupling the voltage of current sensing resistor 137 to input lead 631. Resistor 633 and capacitor 630 act as a low pass filter to filter the initial voltage spikes applied to the base of transistor 612. The base emitter voltage of transistor 612 acts as a reference voltage. When a peak current level is attained, transistor 612 is biased conducting, thereby, automatically lowering the output state at lead 611 to a zero value and immediately cutting off drive to the power switching transistor 106. This arrangement permits use of the hysteresis controller to combine the bias voltage hysteresis response with peak current control.

What is claimed is:

1. A power switching converter circuit in which auxiliary power is derived from a tertiary winding of a power transformer comprising:
   a power switching transistor,
   drive circuitry for applying bias signals to the power switching transistor,
   means for energizing the drive circuit from the tertiary winding including:
   hysteretic means for disabling the drive circuitry in response to a voltage level of the tertiary winding,
   the hysteretic means being operative for disabling the drive means when a voltage of the tertiary winding drops below a first voltage level and further operative for re-enabling the drive means when a voltage of the tertiary winding exceeds a second voltage level, the second voltage level being greater than the first voltage level, wherein the hysteretic means includes a bistable circuit having an output logic state responsive to a sensed voltage level, the bistable circuit comprising:

a voltage divider coupled to sense the voltage of the tertiary winding, a breakdown diode energized by the voltage of the tertiary winding, and switching circuitry responsive to the voltage divider and the breakdown diode for supplying the output logic state.

2. A power switching converter circuit as defined in claim 1 wherein the switching circuitry includes means for selectively shorting out a portion of the voltage divider when the voltage of the tertiary winding changes from below the second voltage level to equaling or exceeding the second voltage level.

3. A power switching converter circuit as defined in claim 2 and further including means for controlling a peak current through the power switching transistor and coupling means for applying a peak current control signal to the switching means of the hysteretic means which includes means for switching an output state of the hysteretic means in response thereto.

4. A power converter circuit comprising:

a power transformer coupling an input and an output and including a tertiary winding for supplying auxiliary power, a power switching transistor, drive circuitry for controlling conductivity of the power switching transistor, means having a hysteretic characteristic for enabling a coupling of power from the tertiary winding to the drive circuitry and operative for energizing the drive circuitry as long as a voltage output from the tertiary winding exceeds a first threshold value and for disabling the coupling of power to the drive circuitry when the voltage output for the tertiary winding drops below the first threshold value and for re-enabling the coupling of power to the drive circuitry when the voltage output from the tertiary winding rises above a second threshold level greater than the first threshold level, wherein the means having a hysteretic characteristic includes means for accepting a voltage output of the tertiary winding, means for responding to the first threshold voltage including a breakdown diode coupled to the means for accepting, and menas for changing response to a second threshold voltage after the means for responding has responded to the first threshold voltage.

5. A power converter circuit as defined in claim 4 wherein the means for responding includes a voltage divider and the means for changing includes means for altering an impedance of the voltage divider.

6. In combination:

power processing means including an input and an output, and power switching means, means for deriving auxiliary power from power processed by the power processing means, means for controlling conductivity of the power switching means, means for energizing the means for controlling conductivity from the means for deriving auxiliary power including:

energy level responsive means for enabling/disabling application of energy to the means for controlling conductivity and having a hysteretic response characteristic, the energy level responsive means including a bistable circuit having an output logic state responsive to a sensed energy level, the bistable circuit comprising:

a voltage divider coupled to sense the energy level of the means for deriving auxiliary power, a breakdown diode energized by the energy level of the means for deriving auxiliary power, switching circuitry responsive to the voltage divider and the breakdown diode for supplying the output logic state, whereby an application of energy to the means for controlling conductivity when an energy level drops below a first threshold and application is enabled when an energy level exceeds a second threshold greater than the first threshold.

7. The combination of claim 6 wherein the switching means includes means for selectively shorting out a portion of the voltage divider when the energy level changes from below the second energy level to equaling or exceeding the second energy level.

8. A power converter comprising:

input means for accepting a voltage source, output means for connecting to a load to be energized, a power transformer with a primary winding coupled to the input means and a secondary winding coupled to the output means, means for switching a power signal connecting the input means means for controlling conductivity states of the means for switching, means for energizing the means for controlling from a source of voltage derived from power flowing through the power converter, the means for energizing including a tertiary winding coupled to the power transformer, means for rectifying a voltage of the tertiary winding, and means for applying a voltage of the means for rectifying to the means for controlling, and means for enabling/disabling the means for controlling in response to a voltage level of a source of voltage derived from power flowing through the power converter, the means for enabling/disabling having a hysteretic response to the voltage level, whereby, the means for controlling is enabled when the voltage level is increasing and attains an upper voltage level, and the means for controlling is disabled when the voltage level is decreasing and attains a lower voltage level.

9. A power converter as defined in claim 8 wherein:

the means for enabling/disabling is coupled to be responsive to a voltage of the means for rectifying and including first means for biasing a switching device and having a voltage divider coupled to a voltage of the means for rectifying and means for shorting a portion of the voltage divider in response to a conduction state of the switching device.

10. A power converter as defined in claim 9 further including:
   means for monitoring a current magnitude in the means for switching a power signal, and
   the means for enabling/disabling including means for activating the means for shorting a portion of the voltage divider in response to the means for monitoring.

11. A power converter as defined in claim 10 wherein:
   the means for rectifying is connected to means for storing a voltage, and the means for storing a voltage is coupled to accept charge from a voltage at the input means.

12. A power converter comprising:
   a power transformer coupling an input and an output and including a tertiary winding, the tertiary winding being coupled through a rectifier to supply energy to an energy storage capacitor for supplying auxiliary power, to control circuitry including
   a power switching transistor,
   the control circuitry including
   drive circuitry for controlling a conductivity of the power switching transistor,
   means for monitoring a voltage level of the energy storage capacitor and operative for enabling the drive circuitry when the voltage level exceeds a first threshold level and for disabling the drive circuitry when the voltage level is below a second threshold level.

* * * * *